(12) United States Patent
Han et al.

(10) Patent No.: US 11,805,507 B2
(45) Date of Patent: Oct. 31, 2023

(54) COMMUNICATION CHANNEL MANAGEMENT

(71) Applicant: Hewlett Packard Enterprise Development LP, Houston, TX (US)

(72) Inventors: Jianpo Han, Beijing (CN); Kuanyue Li, Beijing (CN); Yuying Chen, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 296 days.

(21) Appl. No.: 17/146,036

(22) Filed: Jan. 11, 2021

(65) Prior Publication Data
US 2022/0225343 A1 Jul. 14, 2022

(51) Int. Cl.
*H04W 72/12* (2023.01)
*H04W 84/12* (2009.01)
*H04W 4/80* (2018.01)

(52) U.S. Cl.
CPC ............. *H04W 72/12* (2013.01); *H04W 4/80* (2018.02); *H04W 84/12* (2013.01)

(58) Field of Classification Search
CPC .............................. H04W 72/12; H04W 84/12
USPC ........................................................ 370/329
See application file for complete search history.

(56) References Cited

U.S. PATENT DOCUMENTS

| | | | | |
|---|---|---|---|---|
| 2010/0067516 | A1* | 3/2010 | Sun | H04W 4/80 370/350 |
| 2011/0310821 | A1* | 12/2011 | Kim | H04L 5/0091 370/329 |
| 2015/0250009 | A1* | 9/2015 | Kahn | H04W 76/16 370/329 |
| 2015/0333812 | A1* | 11/2015 | Breit | H04L 25/03343 370/329 |

* cited by examiner

*Primary Examiner* — Angel T Brockman
(74) *Attorney, Agent, or Firm* — Hewlett Packard Enterprise Patent Department (57) ABSTRACT

In embodiments of the present disclosure, a method is provided for managing a communication channel between a first communication unit and a second communication unit in an AP. At the first communication unit, a request is transmitted to the second communication unit for reserving a communication channel. Here, the second communication unit is associated with a Wi-Fi network that is different from a network type associated with the first communication unit, and the first and second communication units share a band of the communication channel. A response for reserving the communication channel is received from the second communication unit. In accordance with a determination that the response indicates the communication channel has been reserved for a time duration, data is transmitted at the first communication unit within the time duration on the communication channel. Therefore, conflicts between the first and second communication units in the AP may be reduced.

16 Claims, 9 Drawing Sheets

COMMUNICATION CHANNEL MANAGEMENT

BACKGROUND

Nowadays, Wi-Fi (Wireless Fidelity), Bluetooth and ZigBee networks are widely used in various environments. In order to provide full supports, access points (APs) usually are equipped with multiple communication units for supporting different networks. For example, an AP may comprise a Wi-Fi unit for a Wi-Fi network and an Internet of Things (IoT) unit for an IoT network (such as a Bluetooth/ZigBee network). However, these communication units are co-located in one AP and share same or similar bands, and thus signal qualities during transmission may be degraded due to interference.

SUMMARY

According to a first aspect of the present disclosure, there is provided a method for managing a communication channel between a first communication and a second communication unit in an AP. At the first communication unit, a request is transmitted to the second communication unit for reserving a communication channel. Here, the second communication unit is associated with a Wi-Fi network that is different from a network type associated with the first communication unit, and the first and second communication units share a band of the communication channel. A response for reserving the communication channel is received from the second communication unit. In accordance with a determination that the response indicates the communication channel has been reserved for a time duration, data is transmitted at the first communication unit within the time duration on the communication channel.

According to a second aspect of the present disclosure, there is provided a method for managing a communication channel between a first communication and a second communication unit in an AP. At the second communication unit, a request for reserving a communication channel is received from the first communication unit. Here, the second communication unit is associated with a Wi-Fi network that is different from a network type associated with the first communication unit, and the first and second communication units share a band of the communication channel. At the second communication unit, the communication channel is reserved for a time duration based on the request. A response is transmitted from the second communication unit to the first communication unit for instructing the first communication unit to transmit data on the communication channel within the time duration.

According to a third aspect of the present disclosure, there is provided an AP comprising a first communication unit and a second communication unit. The first communication unit comprises a first processor and a first memory coupled to the first processor, the first memory storing instructions to cause the first processor to: transmit, to the second communication unit, a request for reserving a communication channel, the second communication unit being associated with a Wi-Fi network that is different from a network type associated with the first communication unit, and the first and second communication units sharing a band of the communication channel. The second communication unit comprises a second processor and a second memory coupled to the second processor, the second memory storing instructions to cause the second processor to: reserve the communication channel for a time duration based on the request; and transmit, to the first communication unit, a response for instructing the first communication unit to transmit data on the communication channel within the time duration.

The above aspects of the present disclosure avoid communication channel collisions between the first and second communication units. Therefore, signal qualities associated with both of the first and second communication units may be improved.

BRIEF DESCRIPTION OF THE DRAWINGS

Embodiments of the present disclosure may be understood from the following Detailed Description when read with the accompanying Figures. In accordance with the standard practice in the industry, various features are not drawn to scale. In fact, the dimensions of the various features may be arbitrarily increased or reduced for clarity of discussion. Some examples of the present disclosure are described with respect to the following figures.

DETAILED DESCRIPTION

Figure 1:
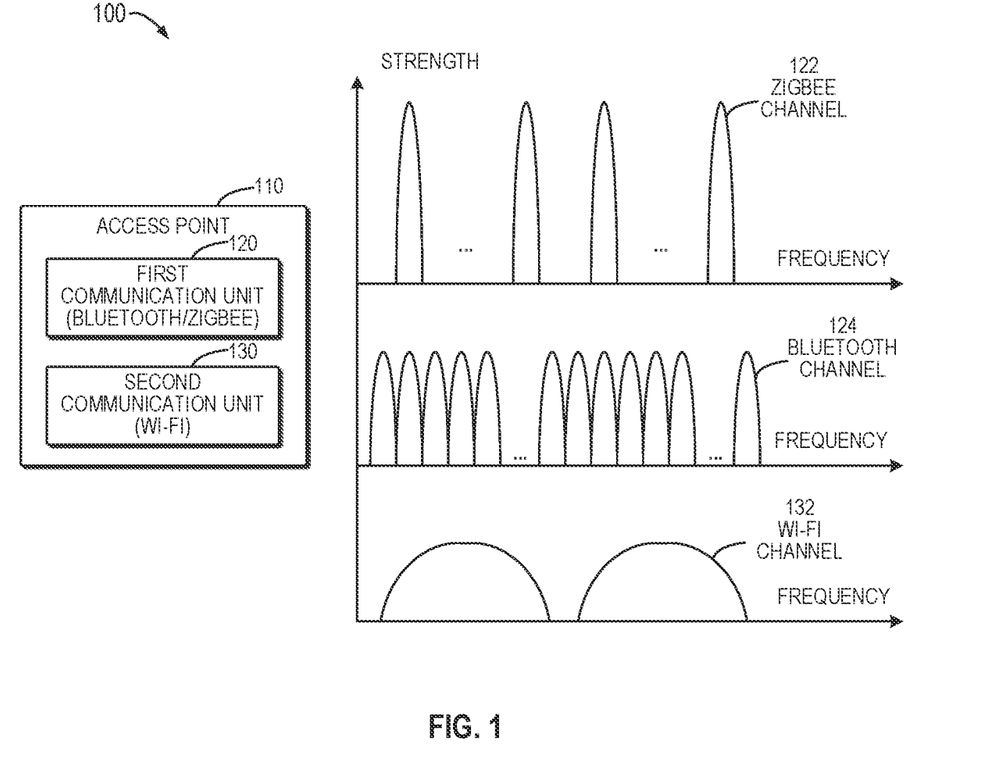
FIG. 1 illustrates a block diagram including multiple frequency ranges of an example AP in which embodiments of the present disclosure may be implemented.

In a network infrastructure, more and more wireless functions are integrated into one hardware device. For example, an AP usually comprises multiple communication units for supporting various wireless networks. The AP may comprise a Wi-Fi unit for a Wi-Fi network and an IoT unit for a Bluetooth/ZigBee network. Reference will be made to FIG. 1 for a brief description of operations of the AP. FIG. 1 illustrates a block diagram 100 including multiple frequency ranges of an example AP in which embodiments of the present disclosure may be implemented. In FIG. 1, an AP 110 may include: a first communication unit 120 for supporting an IoT network such as a Bluetooth/ZigBee network, and a second communication unit 130 for supporting common Wi-Fi network.

However, frequency ranges of the IoT network and the Wi-Fi network overlap, and each of the Bluetooth, ZigBee and Wi-Fi channel may have a corresponding frequency range. As communication units co-located in the AP 110 share same or similar bands, signal qualities may be degraded due to interference. As illustrated in FIG. 1, ZigBee channels 122, Bluetooth channels 124 and Wi-Fi channels 132 are overlapped. If the first communication unit 120 and the second communication unit 130 work at the same time, then signals for different networks may be strongly interfered with each other.

There have been proposed solutions for reducing the interference. In one solution, 3-wire coexist technology has been proposed for activating only one communication unit in the AP during a specified time duration. However, this technology is based on hardware connections between the first and second communication units in the AP, and cannot provide flexible management. Further, this technology cannot solve collisions between separate APs.

Figure 2:
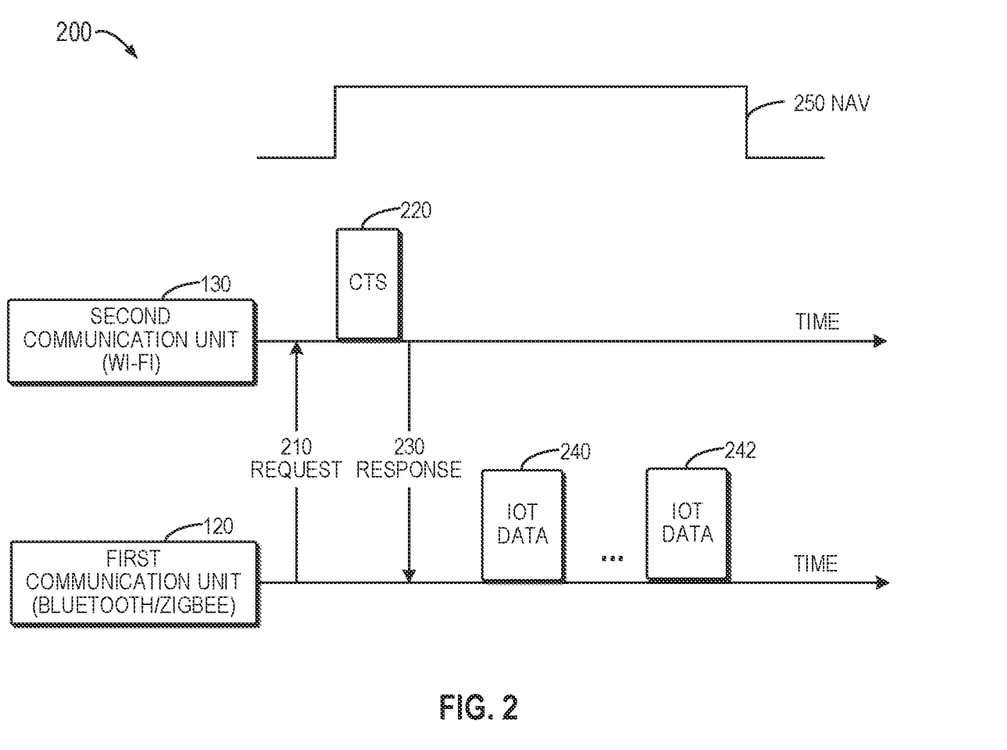
FIG. 2 illustrates a block diagram of an example procedure for managing a communication channel according to embodiments of the present disclosure.

In view of the above drawbacks, embodiments of the present disclosure provide a more effective way for managing a communication channel for an AP. Specifically, if the IoT unit has critical IoT data to be sent via the IoT network, the IoT unit may transmit a request to the Wi-Fi unit for reserving the communication channel for a specified time duration. Once the communication channel is reversed, the IoT unit may send the IoT data within the reserved time duration. Reference will be made to FIG. 2 for more details about reserving the communication channel. FIG. 2 illustrates a block diagram of an example procedure 200 for managing a communication channel according to embodiments of the present disclosure.

FIG. 2 illustrates interactions between the first communication unit 120 and the second communication unit 130. The first communication unit 120 may be associated with an IoT network (such as a Bluetooth/ZigBee network), and the second communication unit 130 may be associated with a Wi-Fi network that is different from the IoT network. As the first and second communication units 120 and 130 share a band of the communication channel, interferences may be caused between the two communication units.

In order to reduce the interferences, the first communication unit 120 may transmit a request 210 to the second communication unit 130 for reserving a communication channel. In some embodiments, the first communication unit 120 may be associated with any of a Bluetooth network and a ZigBee network for carrying IoT data. In the IoT environment, the IoT network is widely used for connecting IoT devices such as sensors and a data center in a client-server architecture. For example, various types of sensors may be deployed at different locations for monitoring environment parameters and transmitting the monitored data to the data center. Meanwhile, AP(s) at the data center may send control data and the like to the IoT devices. Here, the data that is to be transmitted via the IoT network may be assigned with a priority level. For example, control data from the AP may be assigned with a higher priority level, and common data may be assigned with a lower priority level. If the data has a priority that is above a threshold, it means that the first communication unit 120 has critical data to be sent and then the request 210 may be transmitted for triggering the reserving procedure according to the present disclosure.

Figure 3:
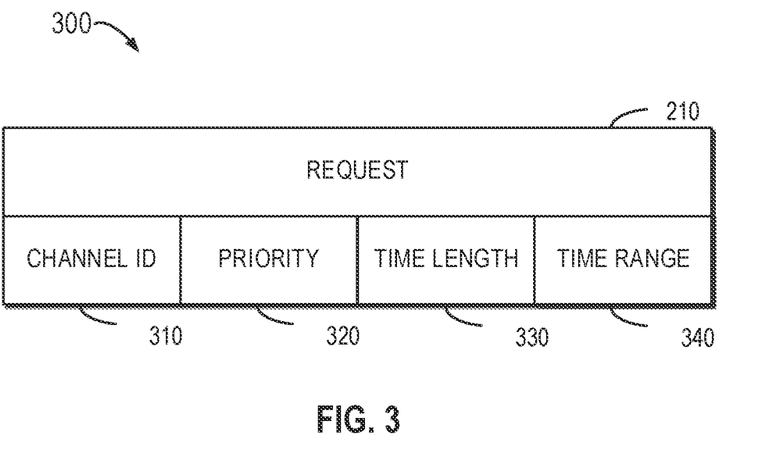
FIG. 3 illustrates a block diagram of an example data structure of a request for reserving a communication channel according to embodiments of the present disclosure.

In some embodiments of the present disclosure, the request 210 may include requirements of the first communication unit 120. FIG. 3 illustrates a block diagram of an example data structure 300 of a request for reserving a communication channel according to embodiments of the present disclosure. As illustrated in FIG. 3, the request 210 may include a channel ID 310 for indicating the communication channel that the first communication unit 120 is expected to reserve. Once the second communication unit 130 receives the request 210, the second communication unit 130 may extract the channel ID 310 and make a reservation based on the channel ID 310.

In some embodiments of the present disclosure, the request 210 may include a priority 320 for indicating a priority of the to-be-sent data. Here, the priority may be represented by an integer number or another value. When the second communication unit 130 receives the request 210, the priority 310 may be compared with a priority of the data that is to be sent by the second communication unit 130. If the priority 310 is higher, then the second communication unit 130 may reserve the communication channel; otherwise, the second communication unit 130 may notify the first communication unit 120 to send another request later.

In some embodiments of the present disclosure, the request 210 may include a time length 330 for indicating how long the communication channel is to be reserved. The time length 330 may be measured by a unit of millisecond or another time unit. For example, the first communication unit 120 may set the time length 330 to 1 ms or another value based on a size of the to-be-sent data. The second communication unit 130 may extract the time length 330 from the request 210 and determine whether an available duration of the communication channel meets the time length 330.

In some embodiments of the present disclosure, the request 210 may include a time range 340 for indicating when the communication channel is required. For example, the time range 340 may be set to "100 ms" for informing the second communication unit 130 that it is desired to reserve the communication channel within 100 ms. Next, the second communication unit 130 may check whether the communication channel is available for 1 ms within the incoming 100 ms.

With the data structure 300 as illustrated in FIG. 3, if the first communication unit 120 expects to reserve the communication channel with an ID of "001" for 1 ms within 100 ms for critical IoT data with a priority of 3, then the request 210 may be defined as "(001, 3, 1, 100)." Once the request 210 is received, the second communication unit 130 may extract various aspects from the request 210 and make the reservation accordingly. Specifically, the second communication unit 130 may check its workload within the time range 340 and determine whether the communication channel with the channel ID 310 will be available or not in the incoming 100 ms. If the communication channel is free, then the second communication unit 130 may reserve the communication channel for a time duration based on the time length 330.

Figure 4:
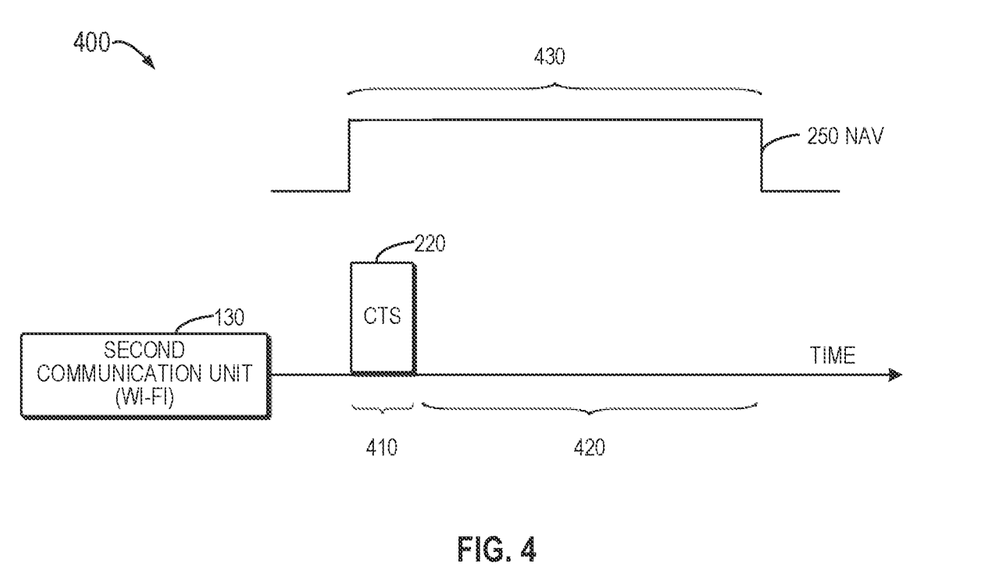
FIG. 4 illustrates a block diagram of an example procedure for reserving a communication channel according to embodiments of the present disclosure.

In some embodiments of the present disclosure, the second communication unit 130 may select a free time duration that matches the time length 330 within the time range 340 based on its workload. It is to be understood that the reservation itself may cost some time, and thus the free time duration of the communication channel should be longer than the time length 330. In some embodiments, the second communication unit 130 may transmit, on the communication channel via the Wi-Fi network, a frame for reserving a time window for the communication channel. Here, the time window should cover a time length for transmitting the frame and the time duration that is specified by the time length 330. Reference will be made to FIG. 4 for more details about the reservation.

FIG. 4 illustrates a block diagram of an example procedure 400 for reserving a communication channel according to embodiments of the present disclosure. As illustrated in FIG. 4, the second communication unit 130 may send a Clear To Send (CTS) frame 220 for reserving a time window 430 for the communication channel. It is to be understood that the time window 430 may include a time duration 410 for sending the CTS frame 220 and the time duration 420 specified by the time length 330 in the request 210. In some embodiments, a time length of the time window 430 should be no less than a summation of the time duration 410 and the time duration 420, such that the first communication unit 120 has enough time for sending the critical data on the reserved communication channel.

Although FIG. 4 illustrates that the communication channel is reserved by a CTS frame 220, another type of frame may be used, for example, a null data frame or another frame may be sent on the communication channel for the reservation. Here, a time length of the time window 430 may be specified in the frame, and the second communication unit 130 may update its network allocation vector (NAV) 250 to a busy state for the time window 430. Therefore, the second communication unit 130 is not allowed to transmit data within the time window 430 and the first communication unit 120 may exclusively use the communication channel for transmitting the IoT data. With these embodiments, no Wi-Fi signal is transmitted during the time window 430 and thus no conflict is caused between the Wi-Fi network and the IoT network.

In order to send the CTS frame, the second communication unit 130 needs to be switched to the communication channel first. At this point, depending on the specific model of the second communication unit 130, the switching procedure may cost about 1 ms to 10 ms. In some embodiments of the present disclosure, if the second communication unit 130 supports Real Simultaneous Dual Band (RSDB) or Dual Band Dual Concurrent (DBDC), the second communication unit 130 may comprise multiple transceivers. At this point, if a first transceiver in the multiple transceivers is occupied (for example, busy for Basic Service Set (BBS)), then a second transceiver may be switched to the communication channel for transmitting the CTS frame.

With these embodiments, the BBS of the second communication unit 130 will not be interrupted and the CTS frame may be sent in parallel with the BBS data, therefore the switch time cost is reduced. It is to be understood that there are only a limited number of communication channels in 2.4 G bands. For an AP that does not support RSDB/DBDC mode, this AP may be switched to 40 M channel width and send Non-HT/HT duplicate CTS to reserve the related channel. In this way, the switch time cost may also be reduced.

In an IoT environment including the AP and multiple IoT sensors, the reservation is triggered at the AP side, and thus downlink IoT traffic may be protected from being interfered. Usually, the uplink IoT traffic relates to measurements from the sensors, which requires lower Quality of Service (QoS) during the transmission. In this situation, even if the uplink IoT traffic is interfered temporarily, operations of the IoT will not be affected significantly.

Further, embodiments of the present disclosure also provide enhanced protections to the uplink traffic. For example, if the AP sends a control instruction to a camera sensor for rotating the camera to another direction, the camera sensor may send a feedback to the AP after the rotation, and the feedback also belongs to critical IoT data. At this point, the first communication unit 120 may determine a total time length for sending the control instruction and receiving the camera sensor's feedback. Then, the time length 330 in the request 210 may be set to the total time length, such that the communication channel may be reserved for bidirectional interactions between the first communication unit 120 and the camera sensor, and thus no Wi-Fi signal will be transmitted on the communication channel. With these embodiments, both of the downlink and uplink traffic may be protected from being interfered.

Figure 5:
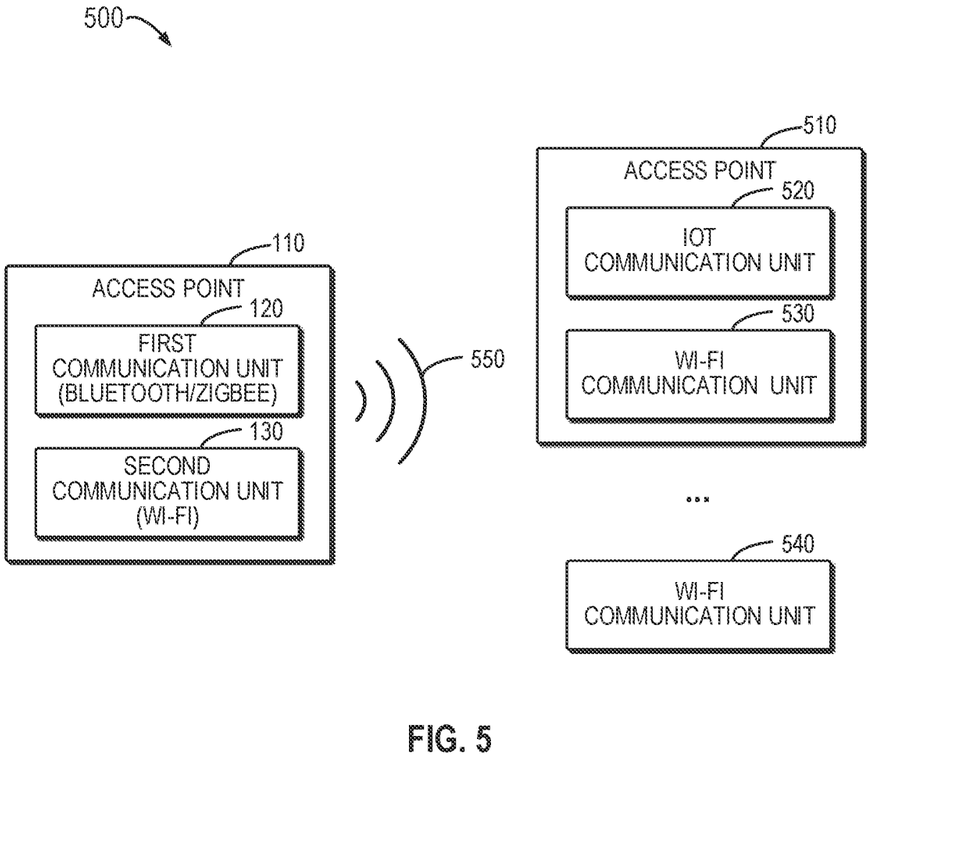
FIG. 5 illustrates a block diagram of an example procedure for notifying other communication units according to embodiments of the present disclosure.

Sometimes, multiple APs may work in the IoT environment and thus Wi-Fi signals from another AP may cause a conflict. Reference will be made to FIG. 5 for more details about the IoT environment. FIG. 5 illustrates a block diagram of an example procedure for notifying other communication units according to embodiments of the present disclosure. Beside the AP 110, there may be another AP 510 which includes an IoT communication unit 520 and a Wi-Fi communication unit 530. Further, a Wi-Fi communication unit 540 may be located near the AP 110. In this situation, even if the second communication unit 130 included in the AP 110 does not transmit data via the desired communication channel, signals from the Wi-Fi communication units 530, . . . , and 540 may interfere the IoT data transmission from the first communication unit 120.

In some embodiments of the present disclosure, the second communication unit 130 may check whether there is another Wi-Fi communication unit nearby. Specifically, a historical neighbor list of the AP 110 may be scanned to see whether another Wi-Fi communication unit exists within its proximity. If it is determined that the Wi-Fi communication units 530, . . . , and 540 are nearby, the second communication unit 130 may broadcast a notification 550 for reserving the communication channel for the time duration. Specifically, the notification 550 may specify the time duration and instruct other Wi-Fi communication units not to transmit any data during the time duration. Once received the notification, the Wi-Fi communication units 530, . . . , and 540 may set their NAV to a busy state and do not transmit any data during the time duration. In these embodiments, the time cost for broadcasting the notification 550 may also be considered. In other words, the time window 430 in FIG. 4 may further include the time cost for transmitting the notification 550.

With the above embodiments, the second communication unit 130 may reserve the communication channel for the time duration as specified by the request 210. Returning back to FIG. 2 for further details about the interactions between the first and second communication units 120 and 130. The second communication unit 130 may send a response 230 to inform the first communication unit 120 a result of the reservation. If the communication channel is reserved successfully, the second communication unit 130 may transmit to the first communication unit 120 a positive response for instructing the first communication unit 120 to transmit data on the communication channel within the time duration. Sometimes, the reservation may fail due to the communication channel is busy. Specifically, if it is determined that no available time duration matching the time length 330 exists within the time range 340, the second communication unit 130 may transmit a negative response for instructing the first communication unit 120 to resend a further request for reserving a communication channel later.

The first communication unit 120 may receive the response 230 and determine a next step based on the received response 230. If it is determined that the response 230 indicates the communication channel has been reserved for the time duration, the first communication unit 120 may transmit the critical IoT data (such as the IoT data packets 240, . . . , and 242) within the time duration on the communication channel. As the first communication unit 120 may be of a Bluetooth unit or a ZigBee unit, the first communication unit 120 may transmit the IoT data packets 240, . . . , and 242 via the Bluetooth network or the ZigBee network. During the reserved time duration, only the first communication unit 120 transmits data on the communication channel and the second communication unit 130 stops working. With this embodiment, the IoT unit may exclusively use the communication channel, and thus the interference may be removed.

In some embodiments of the present disclosure, if it is determined that the response 230 indicates the communication channel has not been reserved, the first communication unit 120 may transmit a further request to the second communication unit 130 for reserving a communication channel. In some embodiments of the present disclosure, the response 230 may inform the first communication unit 120 an available time duration of the communication channel, and then the first communication unit 120 may send another request for reserving the communication channel for the available time duration.

Figure 6:
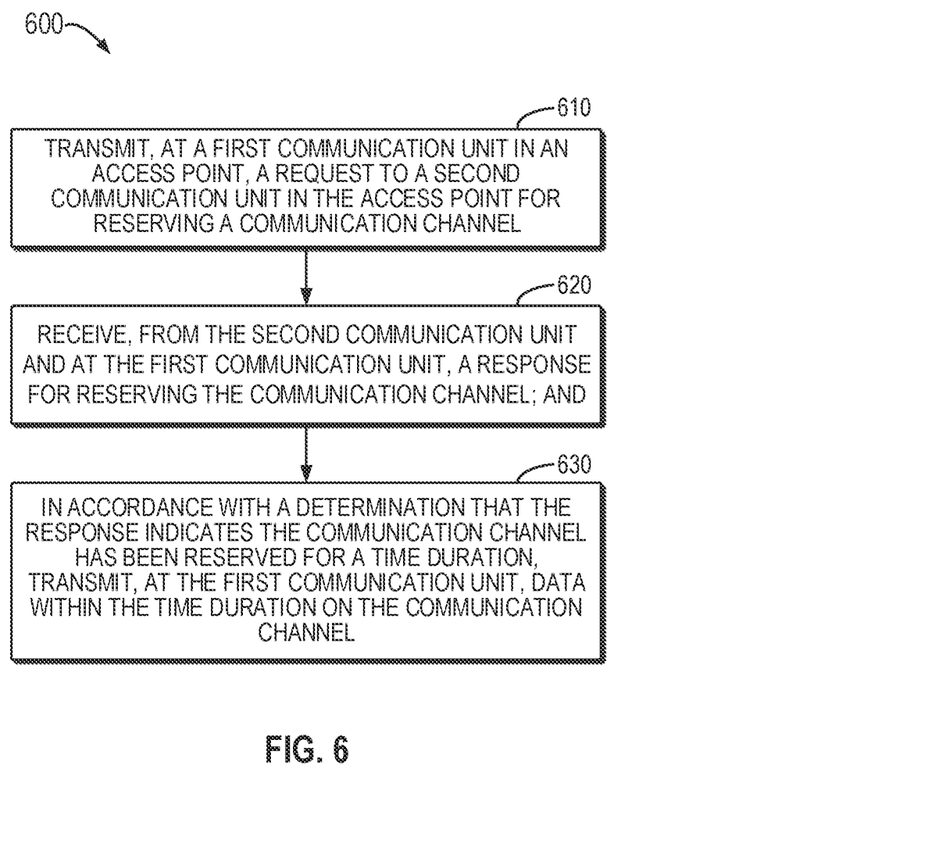
FIG. 6 illustrates a flowchart of an example method for managing a communication channel at a first communication unit in an AP according to embodiments of the present disclosure.

Having described interactions between the first and second communication units 120 and 130, hereinafter, reference will be made to FIG. 6 for steps implemented at the first communication unit 120. FIG. 6 illustrates a flowchart of an example method 600 for managing a communication channel at the first communication unit 120 in the AP 110 according to embodiments of the present disclosure. In some embodiments, the AP 110 includes: the first communication unit 120 that is associated with an IoT network, and the second communication unit 130 that is associated with the Wi-Fi network. Here, the first and second communication units 120 and 130 share a band of the communication channel.

As illustrated in FIG. 6, at block 610, the request 210 is transmitted, at a first communication unit 120 in an AP 110, to the second communication unit 130 in the AP 110 for reserving a communication channel. In some embodiments, the request 210 is transmitted in accordance with a determination that a priority of data that is to be transmitted from the first communication unit 120 being above a threshold. In some embodiments, the request 210 comprises a time range and a time length for reserving the communication channel.

At block 620, the response 230 for reserving the communication channel is received at the first communication unit 120 from the second communication unit 130. In some embodiments, the communication channel is reserved by a frame transmitted from the second communication unit 130 on the communication channel, the frame comprising any of a Clear to Send frame and a null data frame. In some embodiments, the frame reserves a time window for the communication channel, and the time window covers a time length for transmitting the frame and the time duration. In some embodiments, the response 230 comprises the time duration that matches the time length within the time range.

At block 630, in accordance with a determination that the response 230 indicates the communication channel has been reserved for a time duration, data is transmitted at the first communication unit 120 within the time duration on the communication channel. In some embodiments, the first communication unit 120 is associated with any of a Bluetooth network and a ZigBee network for carrying IoT data. In some embodiments, the IoT data is transmitted by the first communication unit 120 within the time duration via any of the Bluetooth network and the ZigBee network. In some embodiments, in accordance with a determination that the response 230 indicates the communication channel has not been reserved, a further request is transmitted from the first communication unit 120 to the second communication unit 130 for reserving a communication channel.

With these embodiments, the method 600 provides an effective solution for managing the communication channel that is shared between the first and second communication units 120 and 130. If the first communication unit 120 has critical data to be sent on the communication channel, the communication channel is reserved for the critical data in advance, such that no data will be sent from the second communication unit 130 and thus the conflict may be avoided.

Figure 7:
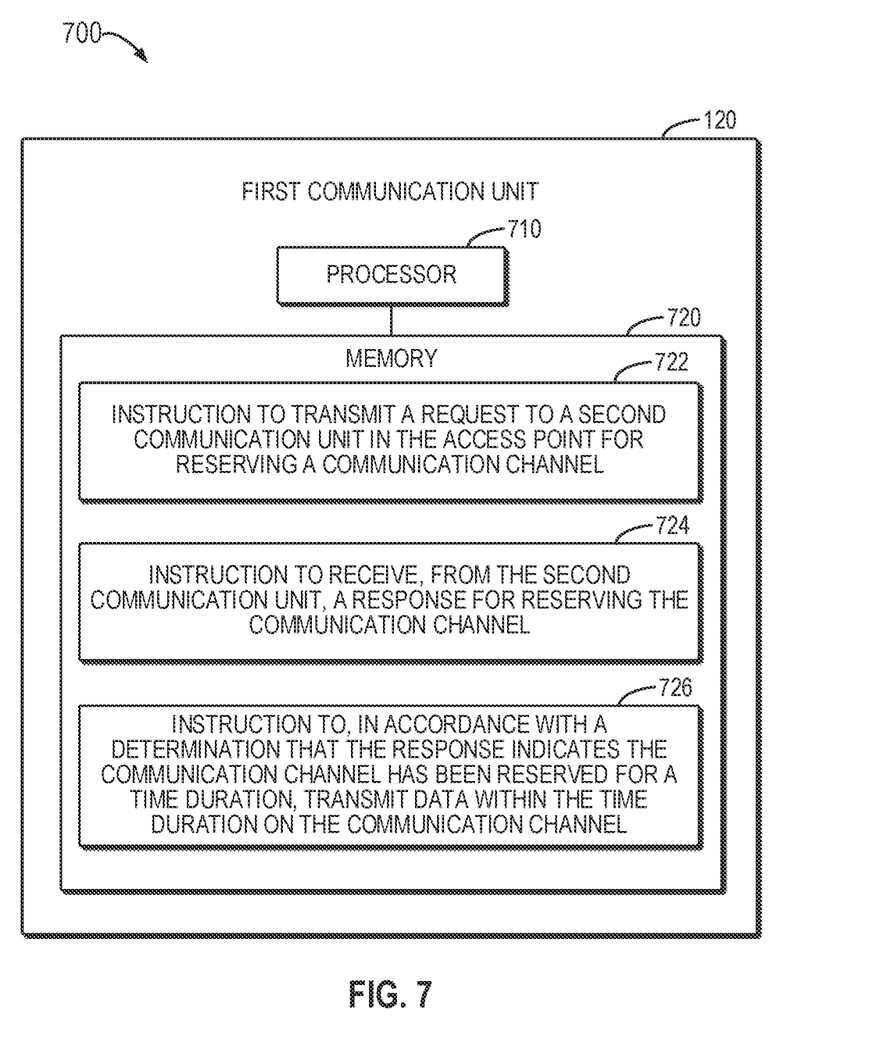
FIG. 7 illustrates a block diagram of a first communication unit in an AP according to embodiments of the present disclosure.

FIG. 7 illustrates a block diagram of the first communication unit 120 in the AP 110 according to embodiments of the present disclosure. The first communication unit 120 comprises a processor 710 and a memory 720 coupled to the processor 710. The memory 720 stores instructions 722, 724, and 726 to cause the processor 710 to implement a method for managing a communication channel. In some embodiments, the AP 110 includes: the first communication unit 120 that is associated with an IoT network, and the second communication unit 130 that is associated with the Wi-Fi network. Here, the first and second communication units 120 and 130 share a band of the communication channel.

As illustrated in FIG. 7, the memory 720 stores the instruction 722 to transmit the request 210 to the second communication unit 130 in the AP 110 for reserving a communication channel. In some embodiments, the memory 720 further stores the instruction to transmit the request 210 in accordance with a determination that a priority of the data that is to be transmitted by the first communication unit 120 being above a threshold. In some embodiments, the request 210 comprises a time range and a time length for reserving the communication channel. In some embodiments, the first communication unit 120 is associated with any of a Bluetooth network and a ZigBee network for carrying IoT data.

The memory 720 further stores the instruction 724 to receive, from the second communication unit 130, the response 230 for reserving the communication channel. In some embodiments, the communication channel is reserved by a frame transmitted from the second communication unit 130 on the communication channel, and the frame comprises any of a Clear to Send frame and a null data frame. In some embodiments, the frame reserves a time window for the communication channel, and the time window covers a time length for transmitting the frame and the time duration. In some embodiments, the response 230 comprises the time duration that matches the time length within the time range.

Further, the memory 720 stores the instruction 726 to transmit data within the time duration on the communication channel in accordance with a determination that the response indicates the communication channel has been reserved for the time duration. In some embodiments, the memory 720 further stores the instruction to transmit the IoT data within the time duration via any of the Bluetooth network and the ZigBee network. In some embodiments, the memory 720 further stores the instruction to transmit from the first communication unit 120 a further request to the second communication unit 130 for reserving a communication channel in accordance with a determination that the response indicates the communication channel has not been reserved.

With these embodiments, once the communication channel is reserved for the first communication unit 120, the second communication 130 that shares the communication channel with the first communication unit 120 is not allowed to transmit data any more. Therefore, the first communication unit 120 may exclusively work on the reserved communication channel until the critical data is transmitted.

Figure 8:
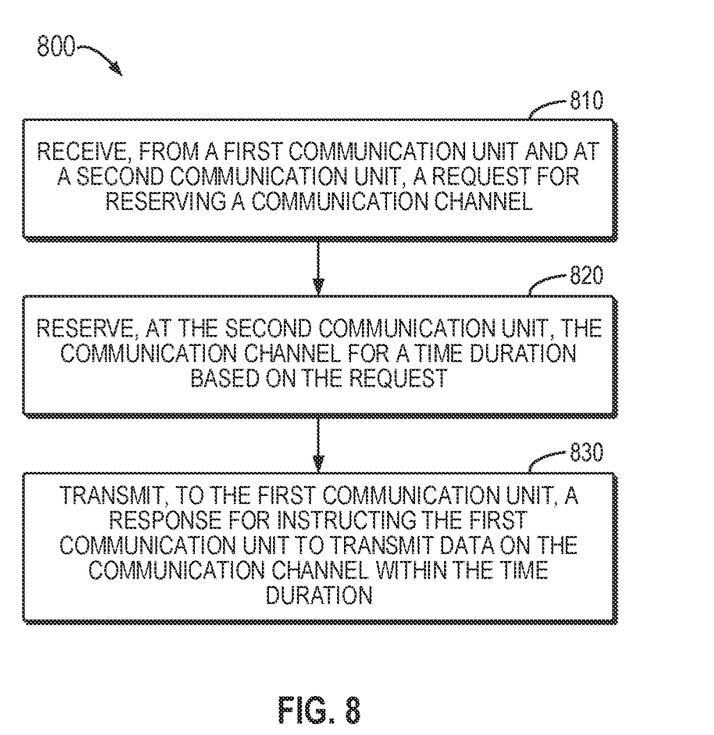
FIG. 8 illustrates a flowchart of an example method for managing a communication channel at a second communication unit in an AP according to embodiments of the present disclosure.

FIG. 8 illustrates a flowchart of an example method 800 for managing a communication channel at the second communication unit 130 in the AP 110 according to embodiments of the present disclosure. In some embodiments, the AP 110 includes: the first communication unit 120 that is associated with an IoT network, and the second communication unit 130 that is associated with the Wi-Fi network. Here, the first and second communication units 120 and 130 share a band of the communication channel.

As illustrated in FIG. 8, at block 810, the request 210 for reserving a communication channel is received at the second communication unit 130 in the AP 110 from the first communication unit 120 in an AP 110. In some embodiments, the request 210 comprises a time range and a time length for reserving the communication channel. In some embodiments, the first communication unit 120 is associated with any of a Bluetooth network and a ZigBee network for carrying IoT data.

At block 820, at the second communication unit 130, the communication channel is reserved for a time duration based on the request 210. In some embodiments, in order to reserve the communication channel, the time duration that matches the time length within the time range is selected based on a workload of the second communication unit 130, and the communication channel is free within the time duration.

In some embodiments, in order to reserve the communication channel, a frame is transmitted on the communication channel via the Wi-Fi network for reserving a time window for the communication channel. In some embodiments, the frame comprises any of a Clear To Send frame and a null data frame, and the time window covers a time length for transmitting the frame and the time duration. In some embodiments, the second communication unit 130 comprises a first transceiver and a second transceiver, and the second transceiver is switched to the communication channel for transmitting the frame in accordance with a determination that the first transceiver being occupied. In some embodiments, a third communication unit that is within proximity of the AP is determined based on a historical neighbor list of the AP. In accordance with a determination that the third communication unit exists, a notification is transmitted to the third communication unit for reserving the communication channel for the time duration. In some embodiments, the notification causes the third communication unit to set its network allocation vector to a busy state.

At block 830, a response is transmitted to the first communication unit 120 for instructing the first communication unit 120 to transmit data on the communication channel within the time duration. In some embodiments, in accordance with a determination that no available time duration matching the time length exists within the time range, the response 230 is transmitted at the second communication unit for instructing the first communication unit 120 to send a further request for reserving a communication channel.

With these embodiments, once the request 210 is received from the first communication unit 120, the second communication unit 130 may reserve the communication channel based on the request 210. During the reserved time duration, the second communication unit 130 is not allowed to send data on the communication channel and thus the critical data sent from first communication unit 120 on the communication channel may not be interfered.

Figure 9:
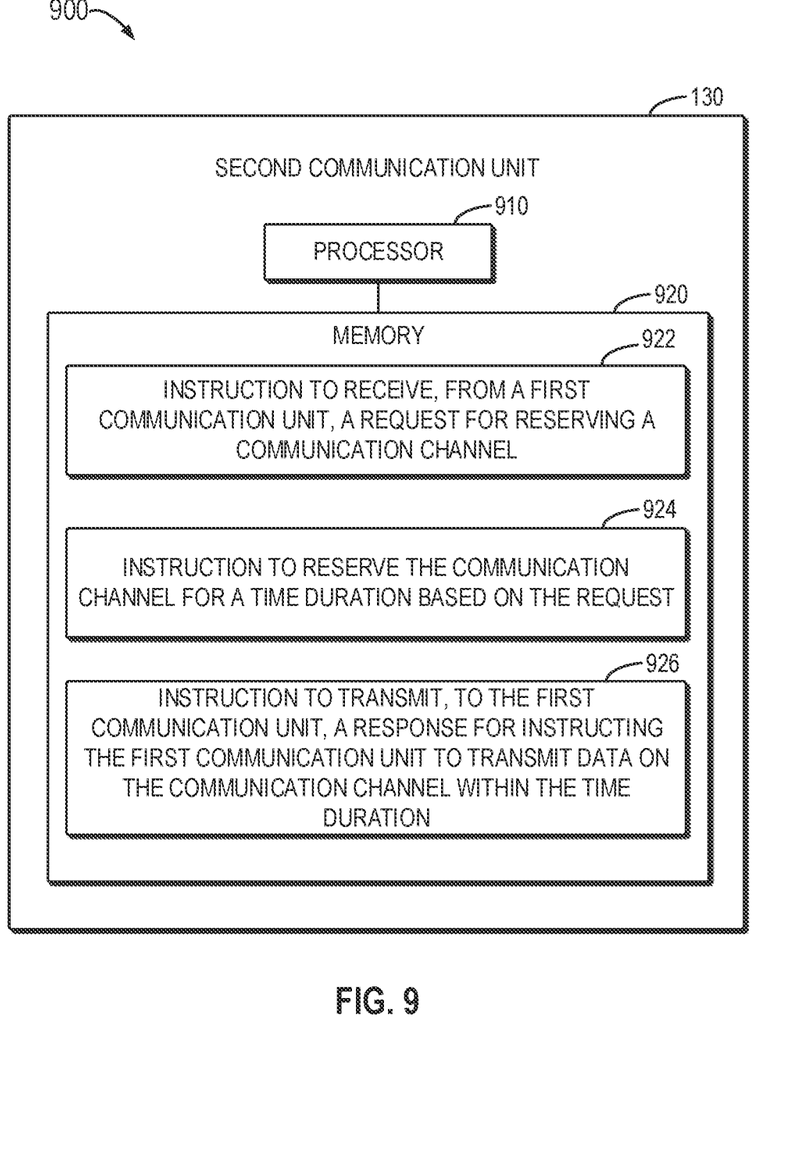
FIG. 9 illustrates a block diagram of a second communication unit in an AP according to embodiments of the present disclosure.

FIG. 9 illustrates a block diagram of the second communication unit 130 in the AP 110 according to embodiments of the present disclosure. The controller 120 comprises a processor 910 and a memory 920 coupled to the processor 910. The memory 920 stores instructions 922, 924, and 926 to implement a method for managing a communication channel. In some embodiments, the AP 110 includes: the first communication unit 120 that is associated with an IoT network, and the second communication unit 130 that is associated with the Wi-Fi network. Here, the first and second communication units 120 and 130 share a band of the communication channel.

As illustrated in FIG. 9, the memory 920 stores the instruction 922 to receive from the first communication unit 120 the request 210 for reserving a communication channel. In some embodiments, the first communication unit 120 is associated with any of a Bluetooth network and a ZigBee network for carrying IoT data. In some embodiments, the request 210 comprises a time range and a time length for reserving the communication channel.

The memory 920 stores the instruction 924 to reserve the communication channel for a time duration based on the request 210. In some embodiments, the memory 920 further stores the instruction to select the time duration that matches the time length within the time range based on a workload of the second communication unit 130, and the communication channel is free within the time duration. In some embodiments, the memory 920 further stores the instruction to transmit, on the communication channel via the Wi-Fi network, a frame for reserving a time window for the communication channel. In some embodiments, the frame comprises any of a Clear To Send frame and a null data frame, and the time window covers a time length for transmitting the frame and the time duration. In some embodiments, the second communication unit 130 comprises a first transceiver and a second transceiver, and the memory 920 further stores the instruction to switch the second transceiver to the communication channel for transmitting the frame in accordance with a determination that the first transceiver being occupied. In some embodiments, the memory 920 further stores the instruction to determine a third communication unit within proximity of the AP based on a historical neighbor list of the AP. In some embodiments, the memory 920 further stores the instruction to transmit to the third communication unit a notification for reserving the communication channel for the time duration in accordance with a determination that the third communication unit is working on the communication channel. In some embodiments, the notification causes the third communication unit to set its network allocation vector to a busy state.

The memory 920 stores the instruction 926 to transmit, to the first communication unit 120, a response for instructing the first communication unit 120 to transmit data on the communication channel within the time duration. In some embodiments, the memory 920 further stores the instruction to transmit a response for instructing the first communication unit 120 to send a further request for reserving a communication channel in accordance with a determination that no available time duration matching the time length exists within the time range. With these embodiments, the second communication unit 130 may reserve the communication channel for the first communication unit 120 to transmit the critical data. If the communication channel is not reserved successfully, the second communication unit 130 may notify the first communication unit 120 to resend the request later.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate embodiments may also be implemented in combination in a single embodiment. Conversely, various features that are described in the context of a single embodiment may also be implemented in multiple embodiments separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. A method, comprising:
    transmitting, at a first communication unit in an access point, a request to a second communication unit in the access point for reserving a communication channel, the second communication unit being associated with a Wi-Fi network that is different from a network type associated with the first communication unit, the first and second communication units sharing a band of the communication channel;
    receiving, from the second communication unit, a response for reserving the communication channel; and
    in accordance with a determination that the response indicates the communication channel has been reserved for a time duration, transmitting, at the first communication unit, data within the time duration on the communication channel, wherein the request comprises a time range and a time length for reserving the communication channel, and the response comprises the time duration that matches the time length within the time range, wherein the first communication unit is associated with any of a Bluetooth network and a ZigBee network for carrying Internet of Things (IoT) data, and transmitting the data comprises transmitting the IoT data within the time duration via any of the Bluetooth network and the ZigBee network.

2. The method according to claim 1, wherein the communication channel is reserved by a frame transmitted from the second communication unit on the communication channel, the frame comprising any of a Clear to Send frame and a null data frame.

3. The method according to claim 2, wherein the frame reserves a time window for the communication channel, the time window covering a time length for transmitting the frame and the time duration.

4. The method according to claim 1, further comprises: in accordance with a determination that the response indicates the communication channel has not been reserved, transmitting, from the first communication unit, a further request to the second communication unit for reserving a communication channel.

5. The method according to claim 1, wherein transmitting the request comprises: in accordance with a determination that a priority of the data being above a threshold, transmitting the request.

6. A method, comprising:
    receiving, from a first communication unit in an access point and at a second communication unit in the access point, a request for reserving a communication channel, the second communication unit being associated with a Wi-Fi network that is different from a network type associated with the first communication unit, and the first and second communication units sharing a band of the communication channel;
    reserving, at the second communication unit, the communication channel for a time duration based on the request; and
    transmitting, to the first communication unit, a response for instructing the first communication unit to transmit data on the communication channel within the time duration, wherein the first communication unit is associated with any of a Bluetooth network and a ZigBee network for carrying Internet of Things data.

7. The method according to claim 6, wherein the request comprises a time range and a time length for reserving the communication channel, and reserving the communication channel comprises: selecting the time duration that matches the time length within the time range based on a workload of the second communication unit, the communication channel being free within the time duration.

8. The method according to claim 7, wherein reserving the communication channel further comprises:
    transmitting, on the communication channel via the Wi-Fi network, a frame for reserving a time window for the communication channel, the frame comprising any of a Clear To Send frame and a null data frame, and the time window covering a time length for transmitting the frame and the time duration.

9. The method according to claim 8, wherein the second communication unit comprises a first transceiver and a second transceiver, and transmitting on the communication channel the frame comprises:

in accordance with a determination that the first transceiver being occupied, switching the second transceiver to the communication channel for transmitting the frame.

10. The method according to claim 7, further comprises:
determining a third communication unit within proximity of the access point based on a historical neighbor list of the access point; and
in accordance with a determination that the third communication unit exists, transmitting to the third communication unit a notification for reserving the communication channel for the time duration.

11. The method according to claim 10, wherein the notification causes the third communication unit to set its network allocation vector to a busy state.

12. The method according to claim 7, further comprises:
in accordance with a determination that no available time duration matching the time length exists within the time range, transmitting, at the second communication unit, a response for instructing the first communication unit to send a further request for reserving a communication channel.

13. An access point, comprising:
a first communication unit, comprising: a first processor and a first memory coupled to the first processor, the first memory storing instructions to cause the first processor to:
transmit, to a second communication unit comprised in the access point, a request for reserving a communication channel, the second communication unit being associated with a Wi-Fi network that is different from a network type associated with the first communication unit, and the first and second communication units sharing a band of the communication channel wherein the first communication unit is associated with any of a Bluetooth network and a ZigBee network for carrying Internet of Things (IoT) data;
transmit the IoT data on the communication channel within a time duration; and
the second communication unit, comprising: a second processor and a second memory coupled to the second processor, the second memory storing instructions to cause the second processor to:
reserve the communication channel for the time duration based on the request; and
transmit, to the first communication unit, a response for instructing the first communication unit to transmit data on the communication channel within the time duration.

14. The access point according to claim 13, wherein the request comprises a time range and a time length for reserving the communication channel, and the instructions further cause the second processor to:
select the time duration that matches the time length within the time range based on a workload of the second communication unit, the communication channel being free within the time duration.

15. The access point according to claim 13, wherein the instructions further cause the second processor to:
transmit, on the communication channel via the Wi-Fi network, a frame for reserving a time window for the communication channel, the frame comprising any of a Clear To Send frame and a null data frame, and the time window covering a time length for transmitting the frame and the time duration.

16. The access point according to claim 14, wherein the instructions further cause the second processor to:
in accordance with a determination that no available time duration matching the time length exists within the time range, transmit a response for instructing the first communication unit to send a further request for reserving a communication channel.

* * * * *